(12) United States Patent
Baxter

(10) Patent No.: US 7,616,220 B2
(45) Date of Patent: Nov. 10, 2009

(54) SPATIO-TEMPORAL GENERATION OF MOTION BLUR

(75) Inventor: Brent S. Baxter, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 723 days.

(21) Appl. No.: 10/747,322

(22) Filed: Dec. 23, 2003

(65) Prior Publication Data

US 2005/0134591 A1    Jun. 23, 2005

(51) Int. Cl.
*G06T 15/70* (2006.01)
(52) U.S. Cl. .................. 345/673; 345/473
(58) Field of Classification Search ............... None
See application file for complete search history.

(56) References Cited

U.S. PATENT DOCUMENTS

| | | | | |
|---|---|---|---|---|
| 4,227,212 A | * | 10/1980 | Woolfson et al. | 348/170 |
| 4,785,818 A | * | 11/1988 | Hardin | 600/443 |
| 5,343,241 A | * | 8/1994 | Richards et al. | 348/97 |
| 5,471,572 A | * | 11/1995 | Buchner et al. | 345/671 |
| 5,500,685 A | | 3/1996 | Kokaram | |
| 5,512,956 A | * | 4/1996 | Yan | 348/606 |
| 5,557,684 A | | 9/1996 | Wang et al. | |
| 5,678,015 A | * | 10/1997 | Goh | 715/782 |
| 5,809,219 A | | 9/1998 | Pearce et al. | |
| 6,008,865 A | * | 12/1999 | Fogel | 348/700 |
| 6,023,301 A | * | 2/2000 | Katata et al. | 348/586 |
| 6,057,847 A | | 5/2000 | Jenkins | |
| 6,075,905 A | | 6/2000 | Herman et al. | |
| 6,211,882 B1 | | 4/2001 | Pearce et al. | |
| 6,243,498 B1 | | 6/2001 | Chen et al. | |
| 6,330,371 B1 | | 12/2001 | Chen et al. | |
| 6,396,520 B1 | | 5/2002 | Ording | |
| 6,417,853 B1 | * | 7/2002 | Squires et al. | 345/473 |
| 6,442,203 B1 | | 8/2002 | Demos | |
| 6,600,491 B1 | | 7/2003 | Szeliski et al. | |
| 6,625,333 B1 | | 9/2003 | Wang et al. | |
| 6,631,240 B1 | | 10/2003 | Salesin et al. | |

(Continued)

FOREIGN PATENT DOCUMENTS

JP        07-328228        12/1995

(Continued)

OTHER PUBLICATIONS

Ozkan et al. Adaptive Motion-Compensated Filtering of Noisy Image Sequences. IEEE Transactions on Circuits and Systems for Video Technology. Aug. 1993.*

(Continued)

*Primary Examiner*—Peter-Anthony Pappas
(74) *Attorney, Agent, or Firm*—Trop, Pruner & Hu, P.C.

(57) ABSTRACT

Embodiments of the present invention blend frames over a specified spatial and temporal extent to produce a smoothly animated appearance at a reduced frame rate. As the window moves further or closer to the viewer, motion blur may be accomplished by a combination of spatial and temporal averaging. Spatial averaging is used in conjunction with temporal averaging to reduce the rate at which images, including desktop images, are composed and to reduce the amount of graphics memory bandwidth needed for the composition.

6 Claims, 4 Drawing Sheets

U.S. PATENT DOCUMENTS

| | | | |
|---|---|---|---|
| 6,654,020 | B2 | 11/2003 | Mori |
| 6,816,552 | B2 | 11/2004 | Demos |
| 6,885,939 | B2 * | 4/2005 | Schmidt et al. ............ 701/211 |
| 6,910,060 | B2 | 6/2005 | Langan et al. |
| 7,084,875 | B2 * | 8/2006 | Plante ........................ 345/473 |
| 7,263,660 | B2 * | 8/2007 | Zhang et al. ................ 715/723 |
| 2002/0094026 | A1 | 7/2002 | Edelson |
| 2002/0135587 | A1 | 9/2002 | Cunniff |
| 2004/0005084 | A1 | 1/2004 | Kondo et al. |
| 2004/0061786 | A1 | 4/2004 | Fletcher et al. |
| 2004/0252759 | A1 * | 12/2004 | John Winder et al. .. 375/240.12 |
| 2005/0138569 | A1 | 6/2005 | Baxter et al. |
| 2006/0209061 | A1 * | 9/2006 | Burch et al. ................ 345/419 |

FOREIGN PATENT DOCUMENTS

| | | |
|---|---|---|
| JP | 2001-043347 | 2/2001 |
| JP | 2003-216964 | 7/2003 |

OTHER PUBLICATIONS

PCT International Search Report, dated Mar. 18, 2005, International Application No. PCT/US2004/041905, International Filing Date Dec. 13, 2004 (16 pgs.).

A. Watt; M. Watt, "The Theory and Practice of Anti-Aliasing Techniques", (pp. 111-152, 262-265), 1992, Addison-Wesley, Wokinham, England, UK Sections 4.3.1-4.3.3, 4.7. 4.7.1 (XP-002320019)—entitled Advanced Animation and Rendering Techniques in PCT Search Report dated Mar. 18, 2005.

Hugo Elias, "Motion Blur" [Online] Oct. 25, 1999, pp. 1-10 (XP002320018) Retrieved from the Internet: URL:http://freespace.virgin.net/hugo.elias/updates.htm>; [retrieved on Mar. 2, 2005] Sections "Creating the effect of motion Blur in an image", "What does this mean to the programmer?".

Frank Dachille IX, et al., "High-Degree Temporal Antialiasing", Computer Animation 2000, Proceedings May 3-5, 2000, Piscataway, New Jersey, USA, IEEE, May 3, 2000, pp. 49-54 (XP010526529) ISBN: 0-7695-0683-6, Sections 1-4.

Watt, A.; Policarpo, F., "3D Games—Real-time Rendering and Software Technology", 2001, Addission-Wesley, Harlow, England, UK (XP-002320102) Sections 3.7, 8.8, 8.9.

Mikio Shinya, "Spati-Temporal Anti-Aliasing by the Pixel-Tracing Method", Systems and computers in Japan, vol. 26, No. 14, 1995. 16 pages. (translated from Denshi Joho Tsushin Gakki Ronbushi, vol. J78-D-II, No. 3, Mar. 1995. pp. 453-464).

Tim Wittenburg, "Motion Blur Effects"., Dr. Dobb's Journal, Jul. 1997. vol. 22, XP 008043948, 4 pages.

Japanese Patent Office, Office Action issued in corresponding Japanese Application No. 2006-547115, 9 pgs, Dec. 2, 2008.

Computer generated translation of Japanese Publication No. 2001-043347, Publication Date: Feb. 16, 2001, 10 pgs.

Computer generated translation of Japanese Publication No. 07-328228, Publication Date: Dec. 19, 1995, 8 pgs.

Computer generated translation of Japanese Publication No. 2003-216964, Publication Date: Jul. 31, 2003, 7 pgs.

* cited by examiner

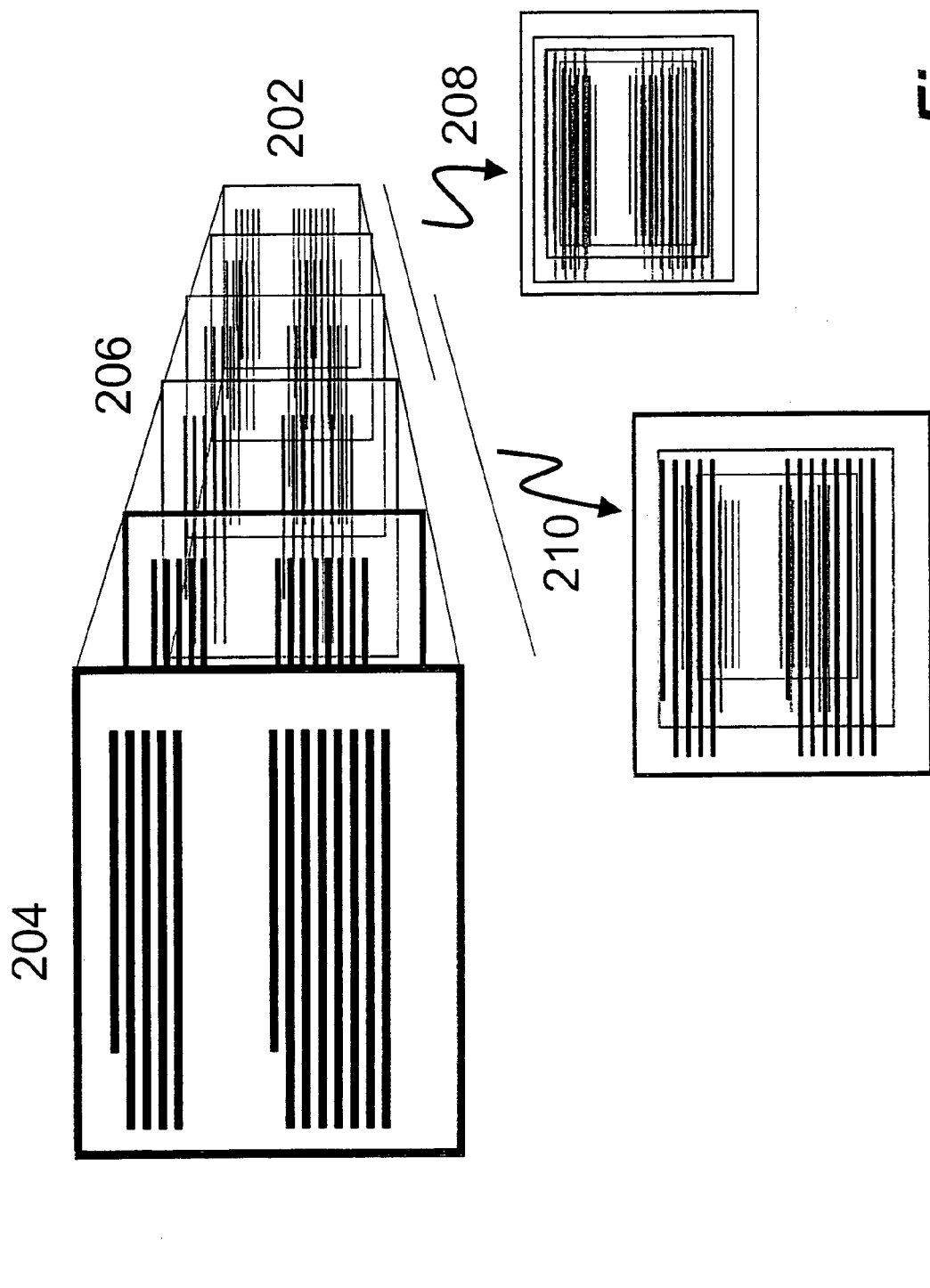

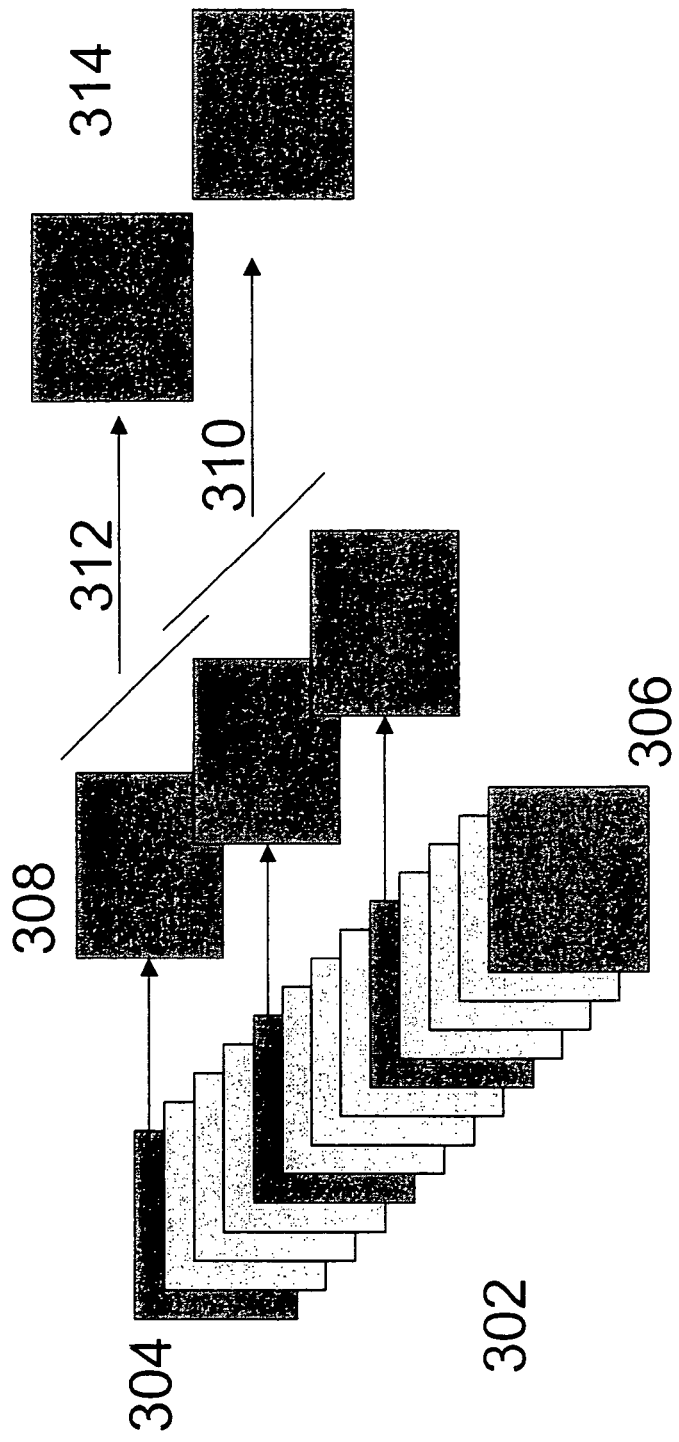

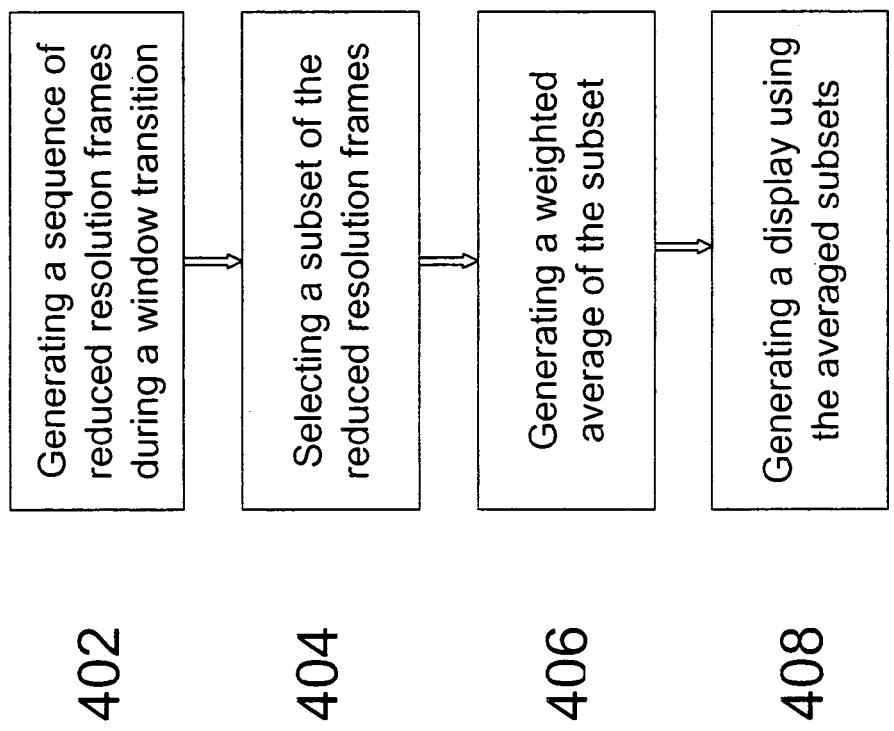

SPATIO-TEMPORAL GENERATION OF MOTION BLUR

RELATED APPLICATION

This application is related to U.S. application number 20050138569A1, filed Dec. 23, 2003, entitled "Compose Rate Reduction For Displays," and assigned to Intel Corporation.

BACKGROUND

A personal computer (PC) display typically shows a stack of application windows corresponding to different types of work a user may be doing (for example, word processing, e-mail, spreadsheet, video, etc.), with the currently active application window at the top of the stack, thus appearing closest to the user. When a user changes from one activity to another, these windows are re-composed into a new desktop image, bringing a new application window to the fore.

Future PC product plans call for composing the application windows using three-dimensional (3D) animation techniques to provide the user with a richer visual experience where the animations move smoothly. To make the animations move smoothly, they must be free from jerkiness that can be caused if the desktop image is not composed rapidly enough. Unfortunately, composing a PC desktop image at sufficiently high rates requires excessive amounts of graphics memory bandwidth, which increases costs to levels that may be unsustainable in products targeting the mobile and low cost PC markets.

Conventionally, to deal with inadequate computational or memory resources, frames are simply dropped. Since image information representing original content is discarded, the result often is animation that is jerky in appearance, similar to animated video often seen on personal computers today. This frame skipping may cause the video frame-rate to drop below the frame rate desired to perceive smooth motion. As a result, low bit rate video may at times look jerky to the user.

BRIEF DESCRIPTION OF THE DRAWINGS

FIG. 2 illustrates a window in which word processing application is being executed.

FIG. 3 is a diagram of an embodiment of spatio-temporal averaging.

FIG. 4 is a flow chart of one embodiment for spatio-temporal averaging.

DETAILED DESCRIPTION

Figure 1:
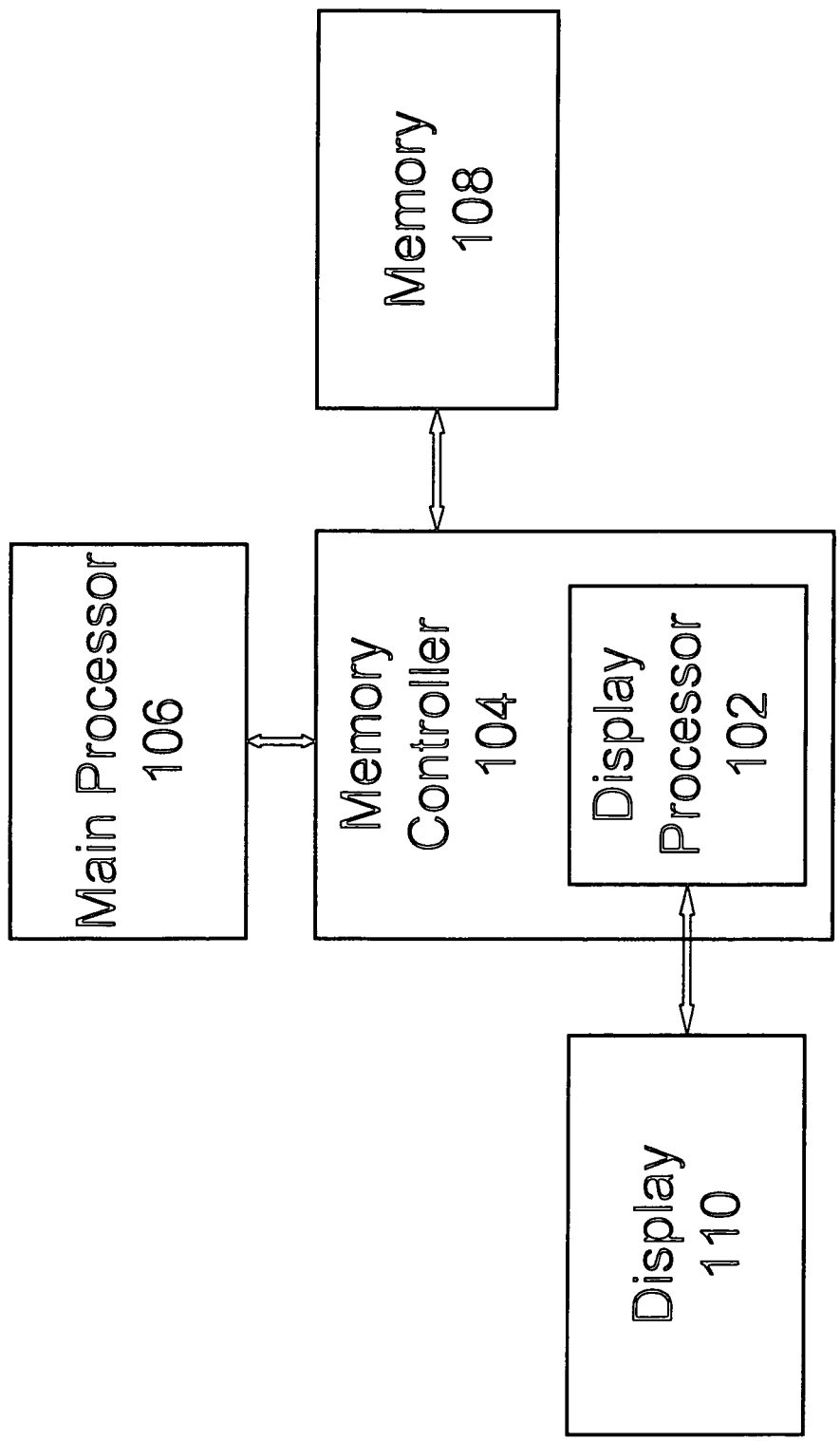
FIG. 1 illustrates a block diagram of an embodiment of a computer system that includes a graphics display system.

This application is related to U.S. application number 20050138569A1, filed Dec. 23, 2003, and entitled "Compose Rate Reduction For Displays," where motion blur is used to create a low frame rate display during window transitions. Embodiments of the invention employ spatial blur to further reduce the required graphics memory bandwidth. This invention reduces the computational cost of motion blur by exchanging a certain amount of temporal averaging for lower cost spatial averaging.

In the present invention, local regions of a window are averaged together, spatially smoothing the window image before being further averaged with similarly generated images produced at earlier and later times. This produces a smooth appearance at a reduced frame rate with reduced computational effort. For example, as a window moves toward or away from the viewer, the motion blur effect may be produced by a combination of spatial and temporal averaging. Spatial averaging is used in conjunction with temporal averaging to reduce the rate at which images, including desktop images, must be composed. Spatial averaging reduces the amount of processing that would otherwise be devoted to a temporal averaging process. Motion blur preserves the perception of smooth motion during 3D animations giving them a pleasing appearance even though they are being composed and displayed at low rates. This reduces the required graphics memory bandwidth, thus reducing PC product costs.

In the detailed description, numerous specific details are set forth in order to provide a thorough understanding of the present invention. However, it will be understood by those skilled in the art that the present invention may be practiced without these specific details. In other instances, well-known methods, procedures, components and circuits have been described in detail so as not to obscure the present invention.

Some portions of the detailed description that follow are presented in terms of algorithms and symbolic representations of operations on data bits or binary signals within a computer. These algorithmic descriptions and representations are the means used by those skilled in the data processing arts to convey the substance of their work to others skilled in the art. An algorithm is here, and generally, considered to be a self-consistent sequence of steps leading to a desired result. The steps include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities. Unless specifically stated otherwise as apparent from the following discussions, it is appreciated that throughout the specification, discussions utilizing such terms as "processing" or "computing" or "calculating" or "determining" or the like, refer to the action and processes of a computer or computing system, or similar electronic computing device, that manipulate and transform data represented as physical (electronic) quantities within the computing system's registers and/or memories into other data similarly represented as physical quantities within the computing system's memories, registers or other such information storage, transmission or display devices.

Embodiments of the present invention may be implemented in hardware or software (microcode), or a combination of both. However, embodiments of the invention may be implemented as computer programs executing on programmable systems comprising at least one processor, a data storage system (including volatile and non-volatile memory and/or storage elements), at least one input device, and at least one output device. Program code may be applied to input data to perform the functions described herein and generate output information. The output information may be applied to one or more output devices, in known fashion. For purposes of this application, a processing system includes any system that has a processor, such as, for example, a digital signal processor (DSP), a micro-controller, an application specific integrated circuit (ASIC), or a microprocessor. Embodiments of the invention provide for a machine readable medium having stored therein a plurality of machine readable instructions executable by a processor to provide for motion blurring.

The above description of illustrated embodiments of the invention is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize. These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

FIG. 1 illustrates a diagram of an embodiment 100 of a computer system that includes a 3-D display processor 102 for generating motion blur using spatial and temporal averaging. Elements of the computer system that are not necessary for an understanding of the present invention are omitted, for convenience. Although display processor 102 is depicted as part of memory controller 104, display processor 102 may also be configured as a stand-alone device. Display processor 102 may also be configured as a single chip device or as part of a system-on-a-chip or a multi-chip module or as part of a plug-in circuit board. Display processor 102 may be comprised in any of various systems, including a computer system, network PC, Internet appliance, a television, including HDTV systems and interactive television systems, personal digital assistants (PDAs), wearable computers, and other devices which display 2D and or 3D graphics renderings, among others.

As shown, the computer system includes a main processor 106 in communication with a memory controller 104 including display processor 102. Display processor 102 is also in communication with memory 108. Main processor 106 may comprise one or more processors of varying types, e.g., microprocessors, multi-processors and CPUs. Memory 108 may comprise any combination of different types of memory subsystems, including random access memories, (e.g., DDR, SDRAM, RDRAM, among others) and mass storage devices. A display device 110 may be coupled to display processor 102. The display device 110 may be any of various types of display monitor or device including but not limited to a video monitor, a cathode ray tube (CRT), liquid crystal display (LCD), reflective liquid-crystal-on-silicon (LCOS), or gas-plasma display. Application software may be executed by the system to display graphical and video objects on display device 110.

Various input devices (not shown) may be connected to the computer system, including a keyboard and/or cursor control device. The cursor control device permits a user to select various command modes, modify graphic data, and input other data. More particularly, input device permits a user to selectively position a cursor at any desired location (such as a windows icon) on display by movement of the cursor control device over a surface. It will be appreciated that a variety of well known input devices may be utilized by the present invention, including other control devices such as mechanical mice, track balls, etc.

FIG. 2 illustrates a diagram of an embodiment 200 of a screen shot of a display environment. This screen shot illustrates one example of how an implementation of the invention creates the perception of blurred motion as the apparent distance between a window 202 and a viewer is increased or decreased. A "window" may be a traditional rectangular region on a display in which data is displayed, as well as smaller sub-regions, such as pop-up, pull-down or other menus, icons, symbols or other display elements, and objects, generally. In this environment, the user interface is provided by an operating system, such as Windows, Linux, OS/2, or Macintosh, as well as one or more windows associated with currently running application programs. In a common implementation, an Internet browser application can run in one window and a word processor application can run in a second window on the desktop of the operating system.

In one embodiment of a window display system, a user clicks on an icon 202 and activates a window that moves to the front 204 to permit manipulation of the data in the window. In objects such as rectangular windows, menus or sub-menus, the data displayed in such objects may include alpha numeric and/or graphic data. Accordingly, it will be appreciated that the apparatus and method of the present invention has application to any object displayed on the display, regardless of the shape, size or function of the object in any particular computer display system.

Referring further to FIG. 2, intermediate windows 208 and 210 have been blurred spatially, such as would occur when taking a photograph of their corresponding full rate frames with the lens out of focus. By applying spatial blur to the individual frames of the object on the display, this method may transform the object in a smooth fashion with a smaller number of intermediate frames than would be required without the spatial blur. As shown, the text of the window is clearly visible and being operated upon by the user once it appears in its full sized state. In contrast, the text of the window appears blurry to the user when it is not in a full sized state. The text becomes more defined as it grows from an icon to a full sized state.

A small icon may include a representation of the contents of a window in thumbnail fashion. For example, an icon includes a headline that grows in size, appearing as if it is arising out of a distant mist, smoothly like a cartoon. When a window icon is clicked and opened, it can appear in a number of ways. In one implementation, the window automatically opens up to display full sized content as shown in FIG. 2. In another implementation the window grows to full size over time and the content fills in after that. In another embodiment, the window may rotate at it makes the transition to full size.

In accordance with embodiments of the invention, frames are first subjected to localized spatial blur, then smoothly blended over a specified time to produce a smooth animation, but at a reduced frame rate. Motion blur is utilized to preserve the perception of motion during these 3D animations giving them a pleasing appearance at low composition rates, which results in the sought after saving in graphics memory bandwidth.

As noted above, temporal averaging can be used to reduce the rate at which images, including desktop images, are composed. In accordance with embodiments of the invention, spatial averaging is used in conjunction with temporal averaging to reduce the computational burden associated with the motion blur. Thus, spatial averaging reduces the amount of processing that would otherwise be required for a strictly temporal averaging process. In a typical implementation, animated user effects are of short duration, typically 0.25 to 0.5 seconds. As long as the animation causes the affected objects to move smoothly, the eye is typically unable to perceive subtle differences in the way averaging is done. Spatial blur can be used to generate blurred images commonly associated with items in motion.

FIG. 3 is a diagram that further illustrates an embodiment 300 of spatio-temporal averaging on frames during a window transition 302 that begins with a first frame 304 and ends with an $n^{th}$ frame 306. A typical embodiment of this invention performs spatial averaging 308 on frames that are more widely separated in time, and thus less costly to process subsequently, than would be required in the absence of spatial averaging. One skilled in the art will recognize that other configurations may be used as well. Frames 302 may be in any of a number of common formats.

The wider spacing of the spatially blurred sequence 308 is due to the frames having lower spatial resolutions than the original content. Fewer output frames are needed during transitions when they have been subjected to spatial averaging. Simultaneous use of spatial and temporal blur exploits multiple processing capabilities commonly available in modern display processor products.

The reduced resolution frames may be stored in memory. It is possible to construct each frame at the proper resolution whenever a frame is to be displayed, but it may be more efficient to construct the frame ahead of time and store it in memory for quick retrieval whenever a window transition is to be displayed. Since the frame may be shown at various resolutions, several different versions of the frame are constructed and stored for later retrieval. By being able to select frames having different resolutions, only the amount of data actually needed is fetched from memory.

Each version of a frame may be identified with its resolution number. Starting with the highest resolution version, each of these versions is a progressively lower resolution pre-filtered representation of the previous one. Each different-sized version has a different level of detail. In a typical implementation, each successive frame has one-half the resolution of the frame above it. A group of different-sized versions of the same windows are formed, for example full resolution, _resolution, _resolution, ⅛ resolution and so forth.

Each frame may be processed at a specific resolution appropriate to its apparent size on the display screen and its degree of motion. For illustrative purposes, the largest of the frames (having resolution 0) can correspond to a full resolution image of the display (for example, 1024 by 768) to allow a window with content, such as an email/web page, to be viewed. Resolution −1 may be half the size of resolution 0, while resolution −2 may be half the size of resolution −1 and so forth. Each successive frame may have one-half the horizontal and vertical dimensions of the preceding frame.

During window movement, frames representing windows having different levels of resolution are utilized. As the perceived distance of the window from the viewer increases, less detail is seen and a lower resolution version may be used, as is well known in the art. For example, when the window is rotated or shrunk or receded into the distance, the frame resolutions can switch from level −2 or −3, having_to ⅛ as many rows or columns. This reduces to 1/16 or 1/64 of the original amount of data, thus allowing for additional savings in memory bandwidth.

As the window moves further or closer to the viewer, motion blur may be simulated by various methods, including but not limited to utilizing reduced resolution (more negative resolution number). Embodiments of the present invention balance the appropriate amount of spatial and temporal averaging to achieve a smooth motion effect. In particular, embodiments of the invention trade spatial blur for temporal blur. By starting with a lower rate of image generation, the temporal average can be calculated on an image that has a lower level of detail and thus less data in it.

Simulated motion blur is used in computer-generated imagery to mitigate visually objectionable artifacts that result from the discrete nature of sampling. Motion blur simulations enable recreation of short-duration exposure intervals of real-world video shutters. Generally, the display of object movement between first and second positions is the simulation of real-world motion blur. As will be described in greater detail below, this process relies upon the calculation of a spatio-temporal average of selected frames.

As the window moves further or closer to the viewer, motion blur may be accomplished by a combination of spatial and temporal averaging 310, 312. In particular, the spatio-temporal average is used to blend image information for a predefined/brief interval before and after the time of the output frame, retaining all of the image information, in a slightly blurred form. After the relevant image information is retained, frames may be discarded to reduce the output rate while retaining sufficient information to reproduce a smoothly moving animation sequence 314.

FIG. 4 is a flow chart of one embodiment 400 of a method for spatio-temporal averaging. Motion blurring of frames is performed by calculating the spatial and temporal averages using window frames with different resolutions.

In step 402, a series of frames of the window, each frame having a different resolution, is generated and stored. As noted above, since the window may be shown at various sizes, several different resolution versions of the window are constructed and stored for later retrieval. Starting with the largest resolution version, each of these versions is a progressively lower resolution pre-filtered representation of the previous one. Each different-sized version has a different level of detail. In a typical implementation, each successive frame has one-half the dimensions of the frame above it. A group of different-sized versions of the same windows are formed, for example full resolution, _resolution, _resolution, ⅛ resolution and so forth.

In step 404, a subset of frames are combined to represent the desired path and appearance of the window. For example, when the window is rotated or shrunk or receded into the distance, the frames chosen may switch from level 0 to −1 to −2 to −3 and so forth. Correspondingly, when the frame is rotated or enlarged from an icon to a full resolution image, the frames chosen can switch from resolution −3 to −2 to −1 to 0.

In step 406, the temporal average is computed for each set of low resolution frames. The wider spacing on the input sequence due to the frames having different resolutions representing the original content indicates fewer input frames need be spatially averaged together as compared with approach where non varying resolution frames are used.

In step 408, the spatially and temporally averaged frames are generated for display to form the transition effect. The result is smoothly animated window transition effect. Many bases for selecting the subset can be used. These bases include any of the bases described above, and any combination of the bases described above and/or variations thereof. Within the scope of the present invention, the subset size is not limited, and can vary from set to set.

In a typical implementation, a small icon has content of a window in thumbnail fashion. The window can include content such as a headline. As the window including headline grows in size, it appears to arise in a mist-like, smooth, blurred fashion. The window starts out as a small instance and subsequent intermediate instances are generated. Each instance appears larger than the other and the temporal average is calculated at selected points to generate frames. For example, after enlargement of a few more frames, another temporal average is calculated based upon the frames to generate the next frame until all the frames have been processed. The animated transitions are typically short, and only 5-6 weighted averages are required to produce the appearance of continuous movement throughout. When the low rate frames are played back, the window animation that the operating system wants will look natural and smooth.

Final window transition frames comprises the combination of all of the spatio-temporally averaged frames. For example, the path from icon to full sized window is blurred. One skilled in the art will recognize that the frames can be used or processed in any of a variety of ways, for example, in a forward sequential fashion typical of video viewing, or in a reverse or scrambled fashion.

The above description of illustrated embodiments of the invention is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize. These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A method of generating a motion blur, comprising:
   generating and storing a series of frames of a window, each frame having a different resolution;
   selecting at least two frames but not all frames of the series of frames to represent the desired path and appearance of the window;
   computing the spatial average of the selected frames, wherein the selected frames are frames that are non-adjacent frames which are separated by a larger amount of time than the amount of time that separates adjacent frames and wherein the spatial average is computed on a reduced number of frames of said generated and stored series of frames of a window due to the frames having different resolutions;
   dividing the spatial averaged frames into subsets of frames;
   computing a temporal average of each of the subsets of frames; and
   using the spatial and weighted averaged frames to generate a display of the window, wherein said generating, storing, selecting, computing and dividing are performed via a computer processor.

2. The method claimed in claim 1, wherein generating and storing a series of frames of a window, each frame having a different level of detail further comprises:
   generating successive frames, each frame having one-half the resolution of the next higher resolution.

3. The method claimed in claim 2, wherein generating several different resolution versions of the window further comprises:
   starting with the largest resolution version, generating each of these versions having a progressively lower resolution pre-filtered representation of the previous one.

4. The method claimed in claim 1, wherein selecting some of the series of frames to represent the desired path and appearance of the window further comprises:
   selecting some of the series of frames to represent the desired path and appearance of the window when the window is rotated or enlarged from an icon to a full resolution image.

5. The method claimed in claim 1, wherein computing a temporal average for each of the subsets of frames further comprises:
   computing the temporal average for a selected number of temporally adjacent full-speed frames.

6. The method claimed in claim 1, wherein generating and storing a series of frames of a window, each frame having a different resolution further comprises:
   generating several different resolution versions of the window.

* * * * *